United States Patent
McDaniel et al.

(10) Patent No.: US 8,779,367 B2
(45) Date of Patent: Jul. 15, 2014

(54) SYSTEM AND METHOD FOR CORRECTING TIMING ERRORS IN A MEDICAL IMAGING SYSTEM

(75) Inventors: David L. McDaniel, Dousman, WI (US); Changlyong Kim, Brookfield, WI (US); Mark David Fries, Germantown, WI (US)

(73) Assignee: General Electric Company, Schenectady, NY (US)

( * ) Notice: Subject to any disclaimer, the term of this patent is extended or adjusted under 35 U.S.C. 154(b) by 192 days.

(21) Appl. No.: 13/400,243

(22) Filed: Feb. 20, 2012

(65) Prior Publication Data

US 2013/0214168 A1 Aug. 22, 2013

(51) Int. Cl.
*G01T 1/29* (2006.01)
(52) U.S. Cl.
CPC .................................. *G01T 1/2985* (2013.01)
USPC .................................................... 250/363.03
(58) Field of Classification Search
CPC ............................................... G01T 1/2985
USPC ................................................ 250/363.03
See application file for complete search history.

(56) References Cited

U.S. PATENT DOCUMENTS

| 4,864,140 | A | 9/1989 | Rogers et al. |
| 5,378,893 | A | 1/1995 | Murray et al. |
| 7,132,663 | B2 | 11/2006 | Williams et al. |
| 7,528,375 | B2 * | 5/2009 | Matsumoto .............. 250/370.01 |
| 7,800,070 | B2 | 9/2010 | Weinberg et al. |
| 2003/0160175 | A1 | 8/2003 | Nygard et al. |
| 2004/0188623 | A1 | 9/2004 | Breeding et al. |
| 2010/0078569 | A1 | 4/2010 | Jarron et al. |
| 2010/0108900 | A1 | 5/2010 | Burr et al. |

* cited by examiner

*Primary Examiner* — Constantine Hannaher
(74) *Attorney, Agent, or Firm* — The Small Patent Law Group (57) ABSTRACT

A method of correcting a timing signal that represents an arrival time of a photon at a positron emission tomography (PET) detector includes receiving a timing signal that represents an arrival time of a photon at a PET detector, receiving an energy signal indicative of an energy of the photon, calculating a timing correction using the energy signal, modifying the timing signal using the timing correction, and generating an image of an object using the modified timing signal. A system and non-transitory computer readable medium are also described herein.

17 Claims, 7 Drawing Sheets

SYSTEM AND METHOD FOR CORRECTING TIMING ERRORS IN A MEDICAL IMAGING SYSTEM

BACKGROUND OF THE INVENTION

The subject matter disclosed herein relates generally to medical imaging systems, and more particularly, to a system and method for correcting timing errors in a Positron Emission Tomography (PET) imaging system.

Radioactive tracers called "radiopharmaceuticals" are often used to perform medical imaging. As the radioactive tracer decays, the radioactive tracer emits positrons. The positrons travel a very short distance before they encounter an electron, and when this occurs, they are annihilated and converted into two annihilation photons, or gamma rays. This annihilation is characterized by two features which are pertinent to PET imaging systems. First, each gamma ray has an energy of 511 keV and second, two gamma rays are directed in nearly opposite directions. An image is generated by determining the number of such annihilations at each location within the field of view.

To generate the image, at least one known PET imaging system includes a detector ring assembly which converts the energy of each 511 keV photon into a flash of light (scintillation photons) that is sensed by a light sensor. Coincidence detection circuits connect to the detectors and record only those photons which are detected approximately simultaneously by detectors located on opposite sides of the patient, referred to as coincidence events.

To accurately determine coincidence events and thereby obtain useful information for generating the image, PET imaging systems utilize timing circuits to accurately identify and log the times at which photons are received at the detectors. The timing circuits typically include digital counters that count time periods based upon a digital clock, and digital counter latches that receive both the count signals from the counters and impulse signals from the detector whenever photons are detected. Based upon the count signals, the counter latches effectively time-stamp the impulse signals with times indicative of when the impulse signals are received, and output this information for use by the PET imaging system in determining coincidence events.

The system may be used to acquire Time of Flight (TOF) data for the coincidence events by determining the difference between the time-stamps of the two coincidence gammas. The system can use this difference to estimate the location along the line joining the two detectors where the positron-electron annihilation occurred.

The analog signal from the light sensor is a sum of the energy signal generated by the detected scintillation photons and a DC background signal. Variation in detector temperature, or other factors, may vary the amplitude of the background signal. In addition, statistical variation in the number of scintillation photons detected may cause variation in the amplitude of the energy signal. The analog signal from the light sensor is sent to both the timing circuit and a circuit to determine the total energy deposited in the detector by the gamma ray. In the case where the signal from the light sensor is a current, the current may be divided with a fraction of the current going to the energy circuit and the remaining current going to the timing circuit. Otherwise, the analog signal from the light sensor may be connected to a buffer amplifier which makes multiple copies of the analog signal with one copy sent to the energy circuit and another copy sent to the timing circuit.

In operation, at least one known timing circuit utilizes a leading edge discriminator on the analog signal output from the detector to identify the time at which a photon was received at the detector. A leading edge discriminator produces a logic signal when the analog signal from the detector crosses a predetermined level. However, the time at which the analog signal crosses the predetermined level, and thus the time when the leading edge discriminator produces the logic signal, depends on the amplitude of the analog signal. Moreover, the analog signal output from the detector has a direct current (DC) offset that changes with temperature and other factors. The change in detector temperature, or other factors, may vary the amplitude of the analog signal. As a result, changes in the height of the analog signal may occur causing the logic signal to "walk" along the time axis. Therefore, the time "walk" phenomena may cause the timing circuit to not accurately identify the arrival time of the photon at the detector and not properly record valid coincidence events.

SUMMARY OF INVENTION

In one embodiment, a method of correcting a timing signal that represents an arrival time of an annihilation photon at a positron emission tomography (PET) detector is provided. The method includes receiving a timing signal that represents an arrival time of a photon at a PET detector, receiving an energy signal indicative of an energy of the photon, calculating a timing correction using the energy signal, modifying the timing signal using the timing correction, and generating an image of an object using the modified timing signal. A system and non-transitory computer readable medium are also described herein.

In another embodiment, an imaging system is provided. The imaging system includes a plurality of detectors supported by a gantry, a plurality of acquisition circuits coupled to the detectors, wherein the acquisition circuits provide event detection signals, and a field programmable gate array (FPGA) utilized to record the event detection signals. The FPGA is programmed to receive a timing signal that represents an arrival time of a photon at a PET detector, receive an energy signal indicative of an energy of the photon, calculate a timing correction using the energy signal, modify the timing signal using the timing correction, and generate an image of an object using the modified timing signal.

In a further embodiment, a non-transitory computer readable medium is provided. The non-transitory computer readable medium is programmed to instruct a computer to receive a timing signal that represents an arrival time of a photon at a PET detector, receive an energy signal indicative of an energy of the photon, calculate a timing correction using the energy signal, modify the timing signal using the timing correction, and generate an image of an object using the modified timing signal.

DETAILED DESCRIPTION

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, the programs may be standalone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide a method and apparatus for correcting a timing signal that represents an arrival time of a photon at a Positron Emission Tomography (PET) detector. The method includes transmitting an analog signal from a detector to both an energy channel and a timing channel. The method further includes utilizing the energy channel to calculate a timing correction and then applying the timing correction to the timing channel.

Figure 1:
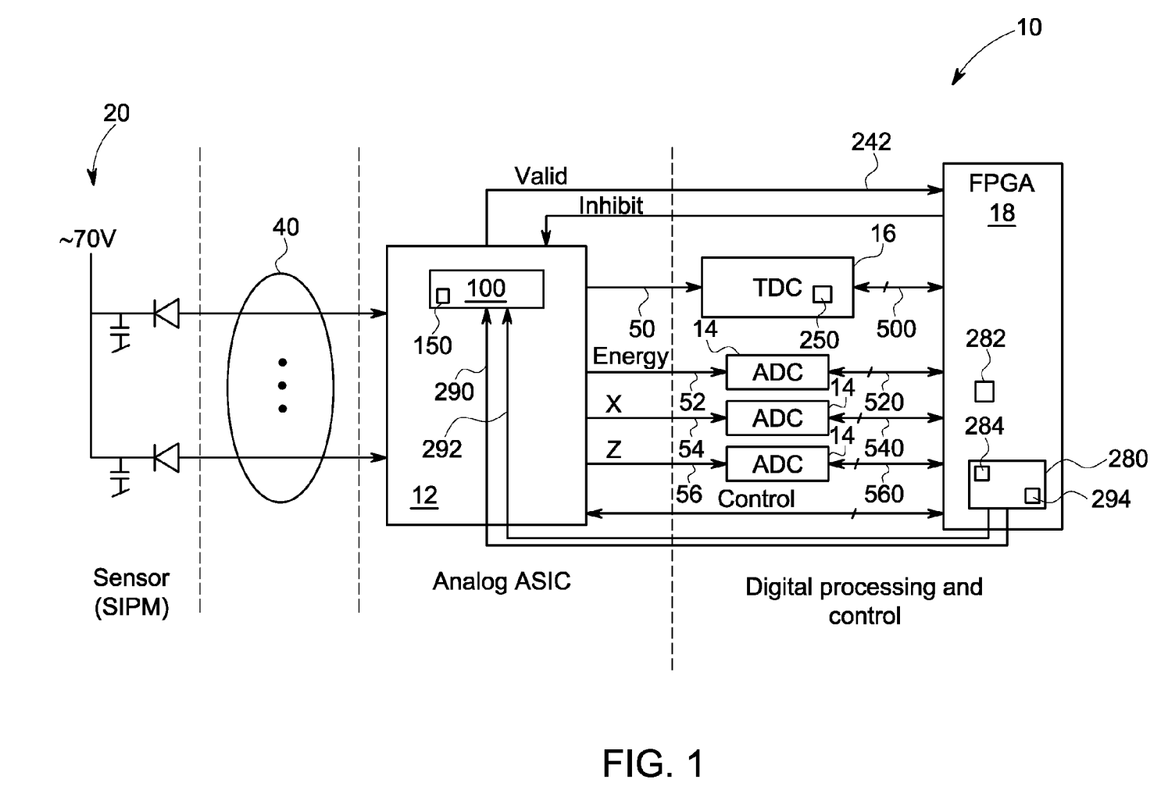
FIG. 1 is a simplified block diagram of an exemplary PET detector electronics including a timing-correction assembly formed in accordance with various embodiments.
Figure 8:
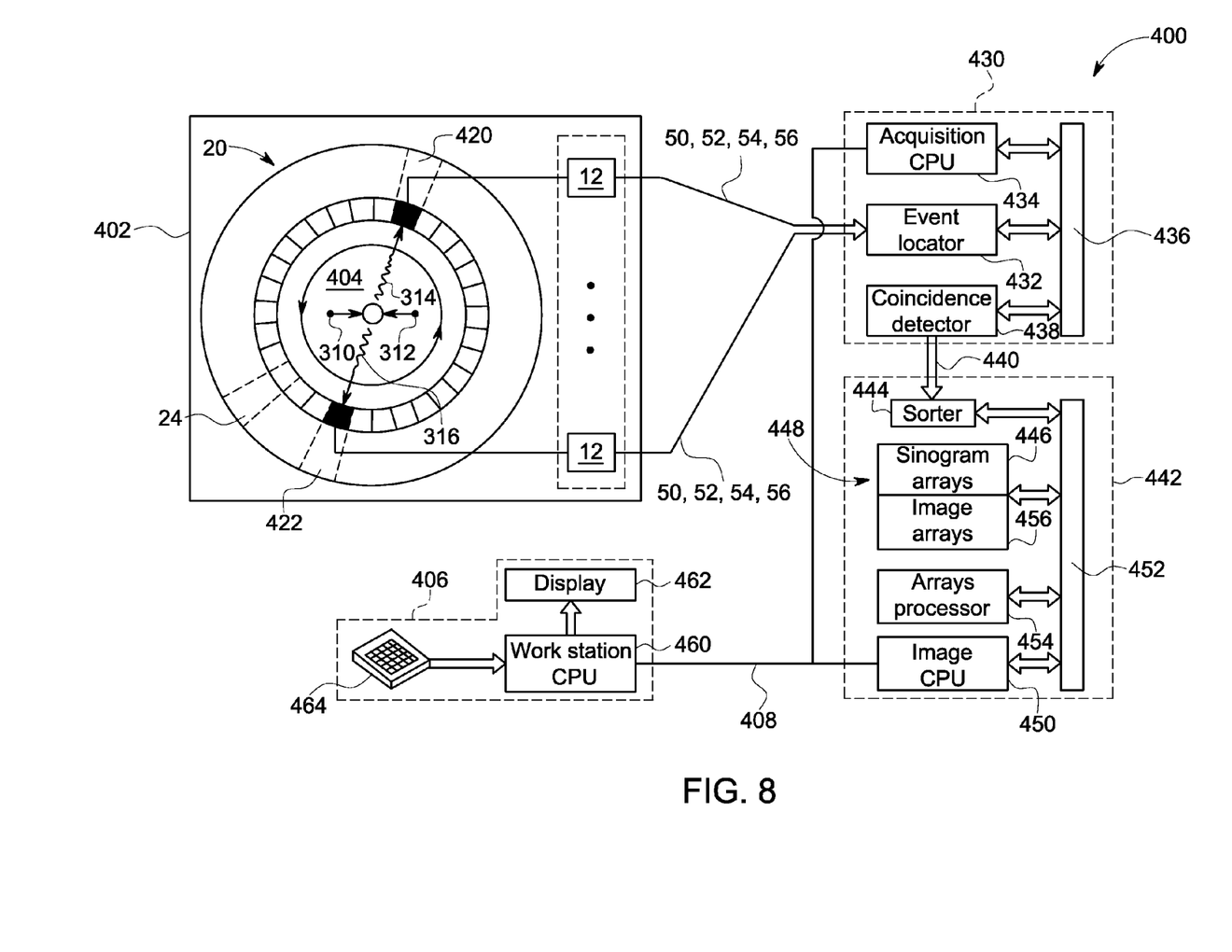
FIG. 8 is a block diagram of an exemplary imaging system formed in accordance with various embodiments.

FIG. 1 is a simplified block diagram of an exemplary PET detector electronics assembly 10 that may form a portion of an exemplary PET imaging system shown in FIG. 8. In various embodiments, the PET detector electronics assembly 10 includes an analog CMOS Application Specific Integrated Circuit (ASIC) 12, a plurality of Analog-to-Digital Converters (ADCs) 14, at least one Time-to-Digital Conversion (TDC) device 16, and a Field Programmable Gate Array (FPGA) 18.

Figure 2:
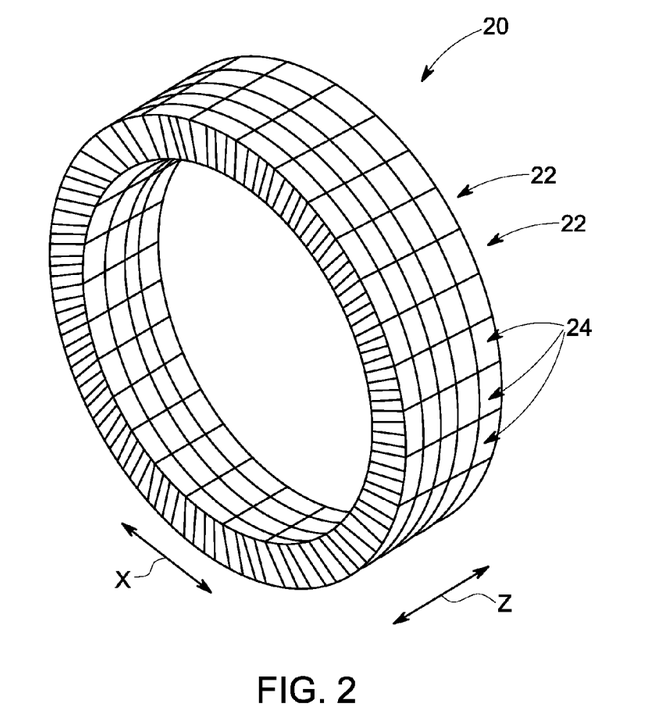
FIG. 2 is a perspective view of an exemplary PET detector assembly formed in accordance with various embodiments.

In operation, the ASIC 12 is configured to receive a plurality of analog inputs from a PET detector assembly 20. For example, FIG. 2 is a perspective view of an exemplary PET detector ring assembly 20 that may be utilized to provide signals to the PET detector electronics assembly 10 shown in FIG. 1. In various embodiments, the PET detector assembly 20 includes a plurality of detector modules 22 that are arranged in a ring to form the PET detector ring assembly 20. Each detector module 22 is assembled from a plurality of detector units 24. Thus, a plurality of detector units 24 are assembled to form a single detector module 22, and a plurality of detector modules 22 are assembled to form the detector ring assembly 20. In various embodiments, the detector assembly 20 includes twenty-eight detector modules 22 that are coupled together such that the detector assembly 20 has a ring shape. In various embodiments, each detector module 22 includes twenty detector units 24 that are arranged in a 4×5 matrix. It should be realized that the quantity of detector modules 22 utilized to form the detector assembly 20 is exemplary, and that the detector assembly 20 may have more than or fewer than twenty-eight detector modules 22. Moreover, it should be realized that quantity of detector units 24 utilized to form each detector module 22 is exemplary, and that the detector module 22 may have more than or fewer than twenty detector units 24.

Figure 3:
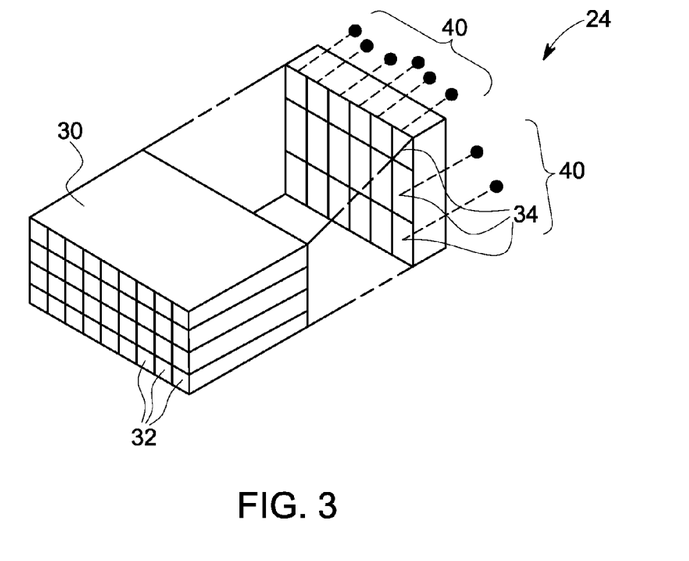
FIG. 3 is a perspective view of a portion of the PET detector assembly shown in FIG. 2.

FIG. 3 is a perspective view of an exemplary detector unit 24 that may form a portion of the detector module 22 shown in FIG. 2. In various embodiments, the detector unit 24 includes a scintillator block 30 having one or more scintillator crystals 32 that are arranged along an x-axis and a z-axis. In various embodiments, the scintillator block 30 has thirty-six crystals 32 that are arranged in a 3×9 matrix. However, it should be realized that the scintillator block 30 may have fewer than or more than thirty-six crystals 32, and that the crystals 32 may be arranged in a matrix of any suitable size.

The detector unit 24 also includes a plurality of light sensors 34. In various embodiments, the detector unit 24 has eighteen light sensors 34 that are arranged in a 3×6 matrix. However, it should be realized that the detector unit 24 may have fewer than or more than eighteen light sensors 34 and that the light sensors 34 may be arranged in a matrix of any suitable size. In the exemplary embodiment, the light sensors 34 are avalanche photodiodes that are connected in parallel and operated above a breakdown voltage in a Geiger mode.

In operation, the scintillator crystals 32 convert the energy, deposited by a gamma ray impinging on the scintillator crystal 32, into visible (or near-UV) light photons. The photons are then converted to electrical analog signals by the light sensors 34. More specifically, when a gamma ray impinges on any one of the scintillators 32 in a detector unit 24, the scintillator detecting the gamma ray converts the energy of the gamma ray into visible light that is detected by all of the light sensors 34 in the detector unit 24. Thus, in the exemplary embodiment, each detector unit 24 is configured to output n analog signals 40, wherein in various embodiments, n=18 such that each analog signal 40 represents the information output from a respective light sensor 34.

Referring again to FIG. 1, as described above, each detector unit 24, in the exemplary embodiment, is configured to output eighteen analog signals 40, wherein each analog signal 40, represents information obtained from a respective light sensor 34. Accordingly, in operation, the ASIC 12 is configured to receive the outputs 40 from the detector unit 24. Each of the outputs 40 includes information that enables the PET detector electronics assembly 10 to determine a point in time at which a photon impinged on a scintillator crystal 32, also referred to herein as the trigger time. Each signal 40 also enables the electronics assembly 10 to determine the energy of the impinging photon based on the amount of light collected by the light sensors 34 and also determine the position of the scintillator crystal 32 generating the light.

Accordingly, the ASIC 12 is then configured to utilize each of the outputs 40 to generate a signal 50 (hit signal) that represents the point in time of a photon impinging on a scintillator crystal 32. The ASIC is further configured to output a second signal 52 (energy signal) that represents the gamma ray energy of the photon, output a third signal 54 (x-coordinate signal) that represents the x coordinate of the scintillator crystal 32 emitting the photon, and to also output a fourth signal 56 (z-coordinate signal) that represents the z coordinate of the scintillator crystal 32 emitting the photon.

Figure 4:
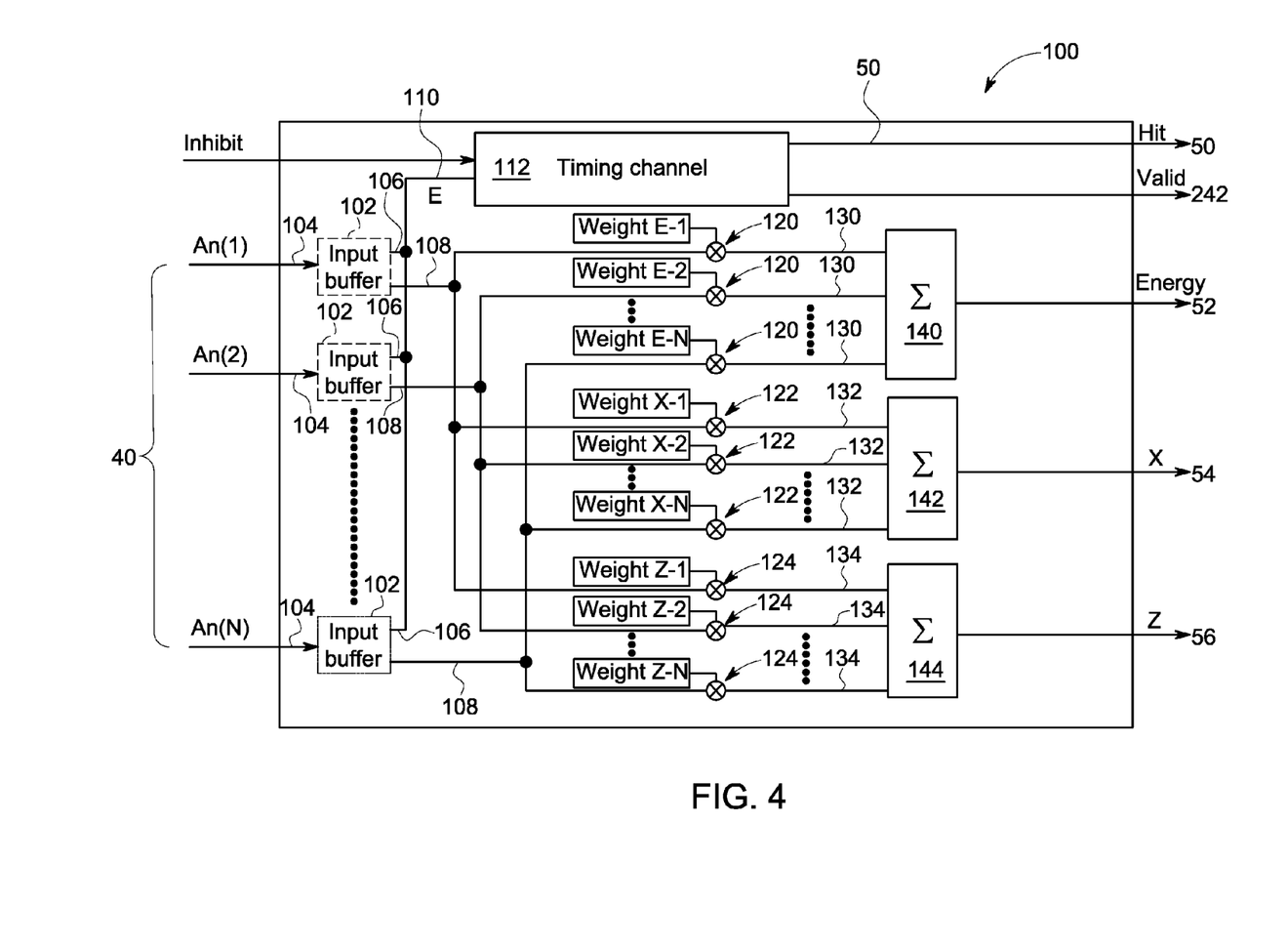
FIG. 4 is a schematic diagram of an exemplary timing, positioning, and energy circuit that may be utilized with the assembly shown in FIG. 1.

FIG. 4 is simplified schematic illustration of an exemplary analog circuit 100 that may form a portion of the electronics assembly 10 shown in FIG. 1. In various embodiments, the analog circuit 100 is formed as part of the ASIC 12 shown in FIG. 1. Optionally, the circuit 100 may be implemented as a software module that is installed in the FPGA 18 or any other processor utilized by a PET imaging system. It should be realized that although FIG. 4 illustrates and describes a single analog circuit 100, the system 10 may include a plurality of circuits 100, wherein each respective circuit 100 is configured to receive the analog outputs from a single detector unit 24 and perform the various signal processing described herein.

The circuit 100 is configured to utilize each of the outputs 40 to generate the hit signal 50, the energy signal 52, the x coordinate signal 54 and the z coordinate signal 56. In various embodiments, the circuit 100 includes a plurality of input buffers 102 that are each configured to receive an analog signal 40 from a single detector unit 34. More specifically, as discussed above, each detector unit 34 is configured to output n analog signals. Accordingly, in the exemplary embodiment, the circuit 100 includes n buffers 102, wherein each buffer 102 is configured to receive one of the n signals 40. In various embodiments, each buffer 102 has an input 104 and two outputs 106 and 108. In operation, an analog signal 40 is provided to the buffer input 104. Each buffer 102 is then configured as an input amplifier and functions to isolate the capacitance of the detector unit 24 from the analog signal 40.

As shown in FIG. 4, and described above, each buffer 102 outputs two signals 106 and 108, which are copies or duplicates of the input analog signal 104 with the capacitance isolated to enable the circuit 100 to perform various processing techniques described herein. In various embodiments, the signals 106 output from the buffers 102 are summed together to generate a timing signal 110 that is input to a timing channel 112. Moreover, in various embodiments, each respective signal 108 that is output from the buffer 102 is transmitted to three weighting devices to facilitate weighting the signals.

More specifically, as discussed above, each analog signal 40 includes information that includes the gamma ray energy of photon, the x coordinate of the scintillator crystal 32 emitting the photon, and the z coordinate of the scintillator crystal 32 emitting the photon. Accordingly, in various embodiments, the signal 108, from each buffer 102, is transmitted to an energy weight device 120 to weight the energy portion of the signal 108. In the exemplary embodiment, a weight having a value of 1 is added to the signal 108 to generate the signal 130. Thus, the signal 130 output from the energy weight device 120 represents a weighted energy signal. The signal 108 is transmitted to an x coordinate weight device 122 to weight the x-coordinate portion of the energy signal 108. In the exemplary embodiment, a weight having a value of between 0 and 1 is added to the signal 108 to generate the signal 132. In the exemplary embodiment, the weight added to the signal 108 to generate the signal 132 corresponds to the row (x-axis) of the scintillator crystal 32 generating the photon. Thus, the signal 132 output from the x-coordinate weight device 122 represents a weighted x-coordinate signal. Moreover, the signal 108 is transmitted to a z-coordinate weight device 124 to weight the z-coordinate portion of the energy signal 108. In the exemplary embodiment, a weight having a value of between 0 and 1 is added to the signal 108 to generate the signal 134. In the exemplary embodiment, the weight added to the signal 108 to generate the signal 134 corresponds to the column (z-axis) of the scintillator crystal 32 generating the photon. Thus, the signal 134 output from the z-coordinate weight device 124 represents a weighted z-coordinate signal. Accordingly, in the exemplary embodiment, the circuit 100 includes n energy weight devices 120, n x-coordinate weight devices 122, and n z-coordinate weight devices 124 to weight the various signals.

The n outputs 130 from the energy weight device 120 are input to a summing device 140. In operation, the summing device 140 sums the n weighted energy signals 130 to generate the energy signal 52 which represents a weighted sum of the energy signals provided by the detector unit 24. The n outputs 132 from the x-coordinate weight device 122 are input to a summing device 142. In operation, the summing device 142 sums the n weighted x-coordinate signals 132 to generate the x-coordinate signal 54 which represents a weighted sum of the x-coordinate values provided by the detector unit 24. Moreover, the summing device 144 sums the n weighted z-coordinate signals 134 to generate the z-coordinate signal 56 which represents a weighted sum of the z-coordinate values provided by the detector unit 24. Accordingly, the circuit 100 is configured to output the energy signal 52, the x-coordinate signal 54, and the z-coordinate signal 56. As discussed above, the circuit 100 is also configured to output the hit signal 50.

Figure 5:
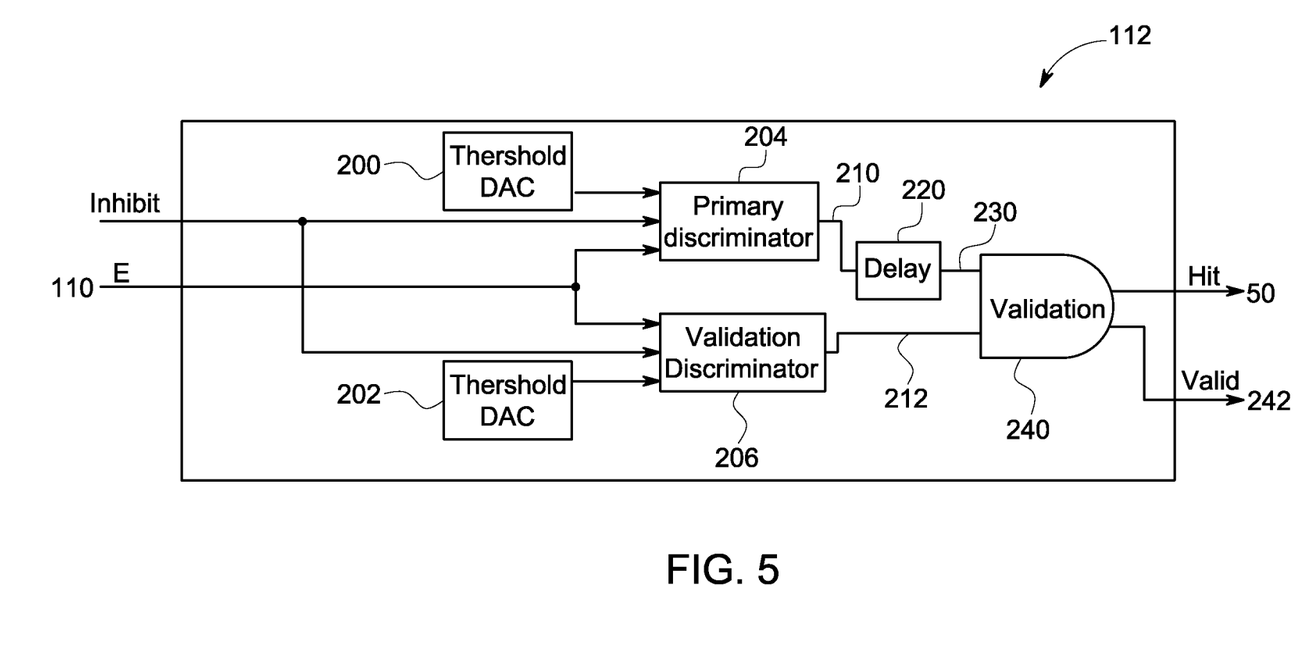
FIG. 5 is a schematic diagram of a portion of the timing circuit shown in FIG. 4.

FIG. 5 is a simplified schematic illustration of the timing channel 112 shown in FIG. 4. The timing channel 112 is configured to utilize the timing signal 110 to generate the hit signal 50. In various embodiments, the timing channel 112 includes a first digital/analog converter (DAC) 200, a second DAC 202, a primary discriminator 204, and in various embodiments, a validation discriminator 206. In various embodiments, the output from the DAC 200 is input to the primary discriminator 204, as a means of setting the primary threshold, and the output from the DAC 202 is input to the validation discriminator 206, as a means of setting the validation threshold. Moreover, the timing signal 110 is input to the primary discriminator 204 and the validation discriminator 206.

As discussed above, the timing signal 110 is the sum of all the outputs 106 from the buffers 102. In various embodiments, the outputs 106 are tied together such that the timing signal 110 is a wired sum of the outputs 106. In operation, the primary discriminator 204 is set at a relatively low predetermined threshold to enable the primary discriminator 204 to latch, or generate a hit signal, when the primary discriminator 204 detects, for example, ten photons. However, it should be realized that the primary discriminator 204 may generate a hit when detecting, for example, five to ten photons. Moreover, the primary discriminator 204 may also be set to generate a hit based on a percentage of the peak value of the signal 110 received. For example, the primary discriminator 204 may generate a signal 210 when the signal 110 is between 3-5 percent of the peak value expected to be generated for a typical signal received from the detectors. In the exemplary embodiment, when the primary discriminator 204 detects a valid event, the primary discriminator 204 is configured to output the signal 210 having a logic value of 1.

In various embodiments, the validation discriminator 206 is set at a predetermined threshold that is greater than the threshold of the primary discriminator 204. For example, the validation discriminator 206 may be configured to latch, or to generate a signal 212 when the validation discriminator 206 detects more than twenty photons. Moreover, the validation discriminator 206 may also be set to generate a hit based on a percentage of the peak value of the signal 110 received. For example, the validation discriminator 206 may generate a signal 212 when the signal 110 is between 6-10 percent of the peak value expected to be generated for a typical signal received from the detectors. It should be realized that in various embodiments, the timing circuit 100 may include only the primary discriminator 204. However, utilizing the validation discriminator 204, having a predetermined threshold that is higher than the primary discriminator 204, enables the validation discriminator 206, to reject random or spurious signals, having a fewer number of photons, and are therefore not representative of a valid coincidence event.

In various embodiments, the signal 210 is input to a delay device 220. In operation, the delay device 220 is configured to add a time delay to the signal 210 to generate a delayed signal 230. More specifically, the signal 210 is delayed because the primary discriminator 204 is set at a lower threshold than the validation discriminator 206, as such, the primary discriminator 204 will trigger before the validation discriminator 206. Therefore, the signal 210 is delayed such that a gated signal, e.g. the hit signal 50, output from a gating device 240, has a leading edge that is determined by the primary discriminator 204. Moreover, the hit signal 50 is only valid when there is a valid validation signal 212 input to the gating device 240. Accordingly, if both inputs 212 and 230, input to the gating device 240, are logic high, the gating device 240 outputs the hit signal 50. In various embodiments, the gating device 240 is also configured to output a validation signal 242.

Referring again to FIG. 1, in various embodiments, the hit signal 50 output from the time circuit 100 (shown in FIG. 4) is input to the TDC 16. In operation, the TDC 16 is configured to compare the hit signal 50 generated by the timing circuit 100 to a system clock 250. Moreover, the TDC 16 is configured to timestamp the signal to indicate the time that the primary discriminator 204 triggered, plus the addition of the delay added by the delay 220. The digitized timing signal 500 (time stamp value from the TDC 16) and the validation signal 242 are then input to the FPGA 18. In various embodiments, the FPGA 18 includes a timing walk correction module 280 that is configured to modify the digitized timing signal 500 to compensate for any time walk that may have occurred in the system 10 and is affecting the hit signal 50.

Figure 6:
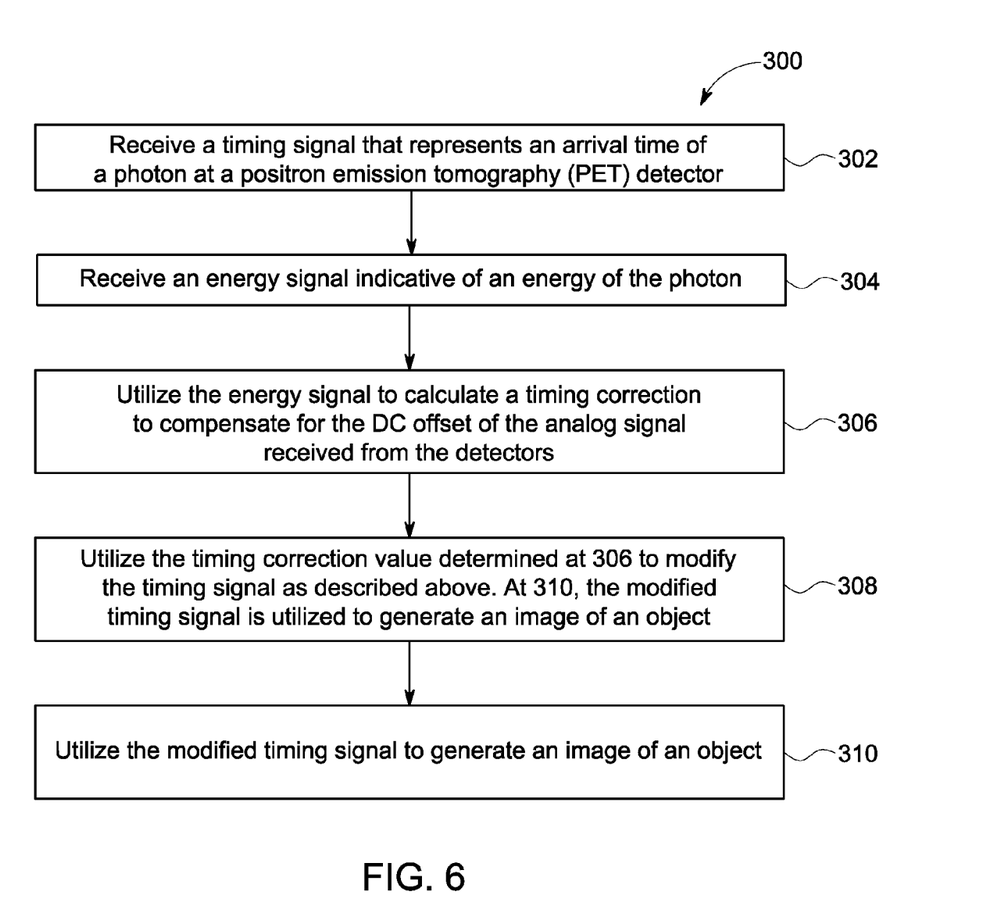
FIG. 6 is a flowchart of an exemplary method of correcting timing walk.

FIG. 6 is a flowchart illustrating an exemplary method 300 of correcting a timing signal that represents an arrival time of a photon at a PET detector. At 302, a timing signal that represents an arrival time of a photon at the PET detector is received at the module 280. In various embodiments, the timing signal is the digitized timing signal 500.

At 304, an energy signal indicative of the energy of the gamma ray is received at the module 280. In various embodiments, the energy signal is the digitized energy 520 which represents a weighted sum of the energy signals output from the buffers 102. More specifically, as discussed above, in operation, the imaging system 10 is configured to generate a plurality of analog signals that are utilized to reconstruct an image of an object being scanned. The analog signals are then utilized to determine when two gamma rays are in coincidence and detected by two different detectors. To identify a coincidence event, the leading edge of the analog signals are identified and time-stamped. In various embodiments, the detectors 24 may generate a dark DC current, or an offset, that changes with temperature and other factors, and therefore varies the amplitude of the signal. Accordingly, the analog signals received from the detectors 24 may include this DC offset overlaid on the gamma pulse information. In operation, the DC offset may cause a time shift in the analog signal that affects the ability of the system to properly identify valid coincidence events.

Figure 7:
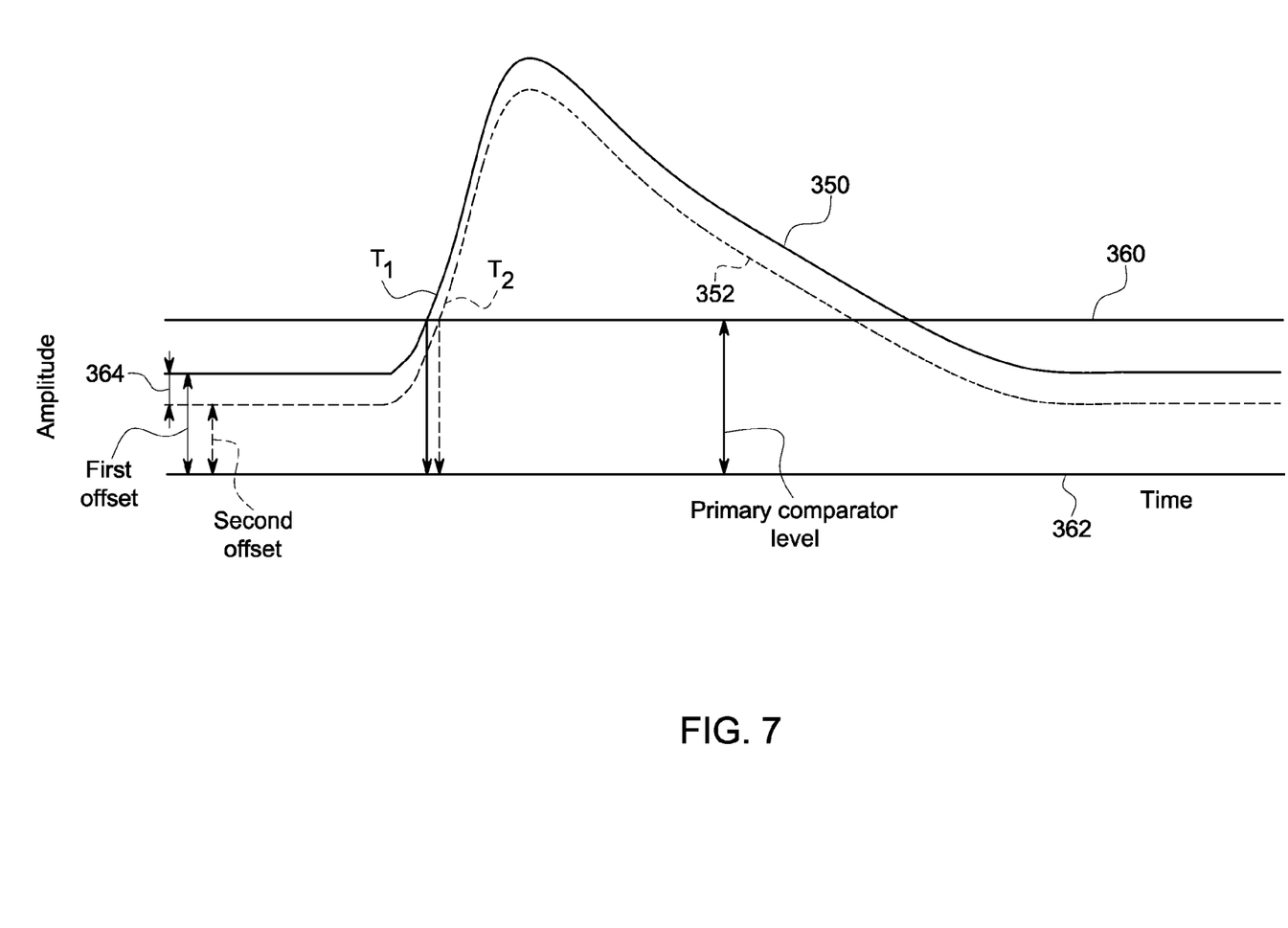
FIG. 7 is a graphical illustration of exemplary analog signals that may be acquired by the assembly shown in FIG. 1.

For example, FIG. 7 is a graphical illustration of two exemplary analog signals 350 and 352 that may be acquired from the detectors 24 shown in FIG. 1. The x-axis represents the estimated arrival time of the analog signals 350 and 352 and the y-axis represents the amplitude of the signals 350 and 252. As shown in FIG. 7, in operation, the first and second signals 350 and 352 rise above a predetermined threshold 360, such as the predetermined threshold utilized by the primary discriminator 204 (shown in FIG. 4) to identify valid signals. In various embodiments, the predetermined threshold 360 is set higher than a baseline threshold 362. Accordingly, in various embodiments, the first signal 360 rises above the predetermined threshold 360 at a time T1 and thus the primary discriminator 204 triggers at the time T1. Moreover, the second signal 362 rises above the predetermined threshold at a time T2 and the primary discriminator triggers at the time T2. As is shown in FIG. 7, the first signal 350 is offset from the second signal 352 by an offset 364. In various embodiments, the offset 364 represents the time walk of the signal 352 compared to the signal 352 that may be caused by the DC current overlaid on the analog signal.

Accordingly, and referring again to FIG. 6, at 306, the energy signal is utilized to calculate a timing correction to compensate for the DC offset or timing walk of the analog signal received from the detectors 24. In various embodiments, the FPGA 18 is utilized to measure the DC offset of the energy signal and utilize the measured offset to correct the timing signal. More specifically, and referring again to FIG. 1, in various embodiments, the FPGA 18 includes the timing walk correction module 280 that is configured to modify the digitized timing signal 500 to compensate for any time walk that may have occurred in the system 10 and is effecting the digitized timing signal 500.

In operation, the walk correction module 280 may be programmed to correct the timing signal in a plurality of different ways. For example, in various embodiments, the module 280 may be programmed to determine the DC offset on the energy signal and utilize the determined offset to modify the threshold 360 of the primary discriminator 204. For example, as shown in FIG. 7, the module 280 may determine the DC offset 364. Based on the determined offset, the module 280 may be programmed to modify a signal 290 to change the level of the threshold 360 to compensate for the DC offset. More specifically, the module 280 may be programmed to increase or decrease the level of the threshold 360 a predetermined amount that is substantially equal to the value of the DC offset 364 measured by the module 280 using the digitized energy 520. Thus, the hit signal 50 is also modified to compensate for the DC offset 364. Accordingly, in the exemplary embodiment, the module 280 is programmed to utilize the signal 290 to correct the TDC value and thus correct the time stamp value of the photon arrival time.

In various other embodiments, the module 280 is programmed to generate a cancellation signal 292 that may be applied to the timing signal. For example, the module 280 may initially determine the DC offset 364 in the digitized energy 520. The module 280 then utilizes the determined offset 364 to generate the cancellation signal 292 that is applied to the timing signal 110. For example, if the DC offset is increasing, the module 280 may be programmed to generate a negative offset signal that is proportional to the DC offset 364 and thus effectively cancel the effects of the DC offset 364 of the timing signal 110. Optionally, if the DC offset is decreasing, the module 280 may be programmed to generate a positive offset signal that is proportional to the DC offset 364 and thus effectively cancel the effects of the DC offset 364 of the timing signal 110 and generate an updated timing that is more representative of the actual time the photons arrived at the primary discriminator 204.

In various other embodiments, the module 280 is programmed to generate a correction factor 294 that may be applied to the digitized timing 500. For example, the module 280 may initially determine the DC offset 364 in the digitized energy 520. The module 280 then utilizes the determined offset 364 to generate the correction factor 294 that is applied to the digitized timing 500. More specifically, in various embodiments, the ADCs 14 are free-running converters such that the ADCs 14 are continuously updating the values of the digitized energy 520. Accordingly, in operation, the ADC 14 which operates on the energy signal 52 is configured to continuously or substantially continuously output a value of the digitized energy 520 to the module 280. The module 280 is configured to receive the continuous signal 242 whether a gamma ray has been detected or when a gamma ray has not been detected. The correction signal 294 can be generated from a look-up table in FPGA depending on the size of offset change 364 in FIG. 7.

In various embodiments, the module 280 is programmed to receive the valid signal 242 and determine a time between consecutive photon events. In the exemplary embodiment, the value of the digitized energy 520 between events is a linear function of the DC offset on the energy signal 52. Accordingly, in the exemplary embodiment, the module 280 is programmed to maintain a running average of all the offset measurements based on the values measured between events on the digitized energy 520. The running averages determined by the module 280 may be stored within a memory 282 in the FPGA 18, for example. The module 280 maintains a running average of the DC offsets measurements continuously and logs when the DC offset changes, which in the exemplary embodiment, is a change in the amplitude of the DC offsets of the detector signals 106 and therefore a change in the timing signal 110. It should be realized that the DC offset determined by the module 280 is a linear function of the DC offset on the signal input to the A/D converter 280 which is also a linear function of the DC offset received from the detectors 24. Accordingly, the digitized energy 520 is utilized to measure the DC offset instead of the timing signal 50 which is relatively difficult and may require additional circuitry.

In various embodiments, once the module 280 has measured the DC offset, the DC offset is compared to a plurality of values stored in, for example, a look-up table (LUT) 284. The LUT 284 may be located in the module 280 as shown in FIG. 1, or optionally located in the memory device 282 in the FPGA 18. More specifically, the values in the LUT 284 represent offset correction values that are utilized to generate the signal 294. For example, the module 280 may determine that the digitized energy 520 has a DC offset of 20 units. In this embodiment, the module 280 searches the LUT 284 to locate the DC offset of 20 units. In the exemplary embodiment, the module 280 then determines a DC offset correction value that is based on the measured DC offset of 20 units. The module 280 then utilizes the determined offset to generate the correction factor 294 which is applied to the digitized timing 500. In various other embodiments, the module 280 may utilize the DC offset correction value to operate a current source (not shown). The current source may be configured to output a current cancellation signal 292 to the timing circuit 100 to modify the timing signal 110, or to output a control signal 290 to the timing circuit 100 to modify the primary threshold 200.

Referring again to FIG. 6, at 308, the timing correction value determined at 306 is utilized to modify the timing signal as described above. At 310, the modified or revised timing signal is then utilized to generate an image of an object. Accordingly, the method described herein utilizes the energy signal to generate a timing correction. The timing correction is then applied to the timing signal to generate a new or revised timing signal. The revised timing signal is then utilized to more accurately time stamp coincidence events which are then used to reconstruct an image of the object.

Described herein are various devices and methods for measuring a DC offset on an energy signal and generating a DC offset correction value that may be applied to the timing signal. In operation, the sum of all the detector unit 24 outputs are initially summed and a centroid calculation is performed to generate a weighted x-coordinate signal and a weighted z-coordinate signal which are both utilized to determine the x and z coordinates of the scintillators detecting a gamma ray interaction with the detector. Additionally, the detector outputs are processed with a fast (high bandwidth) channel, e.g. the primary discriminator 204, to determine the time when the gamma ray interacted with the detector. In operation, the system measures the DC offset of the energy signal on a slow channel, e.g. the energy signal 52, and uses any change in DC offset value to correct for the change of the offset in the fast channel. In addition, measuring both the energy of the gamma ray and the offset of the energy channel (and therefore the offset on the fast channel) allows the calculation of a correction to the measured interaction times for gamma rays of less than 511 KeV energies relative to the interaction time that would have been measured if that gamma ray would have had an energy of 511 KeV and the offset had not changed. The correction is a function of both the DC offset and the energy of the gamma ray. The correction function may be calculated from the shape of the energy signal at the fast channel comparator, or determined by measuring the change in the measured interaction time for 511 keV gamma rays as a function of the comparator's threshold value.

In various embodiments, the absolute value of the DC offset of the slow channel may be measured before the start of data acquisition, and the change in the DC offset on the slow channel used to determine the change in the DC offset on the fast channel. More specifically, the slow or the fast channels may have a contribution to the DC offset that is constant over the data acquisition and is not seen on the other channel. The implementation of the measurement of DC offset may be made after the slow signal, e.g. the energy signal, is analog-to-digital converted and processed by digital electronics. In various other embodiments, the correction signal may be implemented digitally during a calibration phase in the electronics and stored to characterize the detector and real-time feedback data may then be collected during scan data acquisition.

FIG. 8 is an exemplary imaging system 400 that may be utilized to implement the various methods and devices described herein and formed in accordance with various embodiments. The imaging system 400 is utilized to acquire and process image data to generate an image of an object. In the illustrated embodiment, the imaging system 400 is a PET imaging system configured to acquire image data and to process the image data for display and analysis. In various embodiments, the imaging system 400 includes a gantry 402 that supports a cylindrical detector ring assembly, such as the PET detector assembly 20 shown in FIG. 2. As described above, the detector assembly 20 includes a plurality of detectors that are disposed about a central opening aperture (imaging volume) 404. The detector ring assembly 20 generally forms a complete ring about the imaging volume 404. A patient table (not shown) may be positioned within the aperture 404 of the PET system 400. A patient table controller (not shown) moves the patient table into the imaging volume 404 in response to commands received from an operator workstation 406 through a communication link 408 such as a local area network (LAN). Additionally, a gantry controller (not shown) may be configured to receive commands from the operator workstation 406 through the communication link 408 to operate the gantry 402.

In operation, a patient is injected with a radioactive tracer that decays and emits a positron 310 that annihilates with electrons 312 in the body of the patient. This annihilation produces two high energy (about 511 KeV) photons 314 and 316 propagating in nearly opposite directions (about 180 degrees apart) that are in coincidence. The photons 314 and 316 are detected by the detector ring assembly 20 surrounding the patient. When a detector 420 detects the photon 314 from an annihilation event, a detector 422 opposite the detector 420, looks for a matching photon 316. If two matching photons 314 and 316 are recorded within a short timing window (e.g., nanoseconds) of each other (also referred to as a coincidence timing window), the detectors 420 and 422 register a coincidence event along the line connecting the two detectors 420 and 422 also known as a line of response.

In operation, the signals output from the detectors 24 are input to a plurality of acquisition circuits, such as the ASICs 12. The ASICs 12 receive the analog signals 314 and 316 from the detector units 24 and generate analog signals, such as the signals 52, 54, and 56, described above which indicate the event coordinates and the total energy of the gamma rays. Each ASIC 12 may also generate an event detection pulse, e.g. the timing signal 50, which indicates the moment the scintillation event took place. The analog signals 50, 52, 54, and 56 from the acquisition circuits 12 are then processed by a data acquisition system 430 (DAS).

The data acquisition system 430 may include an event locator 432 that periodically samples the digital signals 50, 52, 54, and 56 produced by the acquisition circuits 12. The data acquisition system 430 also includes an acquisition processor 434 that controls the communication link 408 and a data bus 436 (backplane bus). The event locator 432 may assemble the information regarding each valid event into an event data packet that indicates when the event took place and the position of the detector 24 that detected the event. This event data pack is conveyed to a coincidence detector 438, which may be a part of the data acquisition system 430.

The coincidence detector 438 may receive the event data packets from the event locators 432 and determine if any two of them are in coincidence. Coincidence is determined by a number of factors. First, the time markers in each event data packets may be within a specified time window of each other. Second, the locations indicated by the two event data packets may lie between a pair of detectors, such as those indicated by reference numeral 420 and 422, which may have a line of response that passes through the field of view in the imaging volume 404. Events that cannot be paired as such are discarded, but coincident event pairs are located and recorded as a coincidence data packet that is conveyed through a link 440 to an image reconstructor 442. Additionally, the coincidence detector 438 may include the FPGA 18. Accordingly, the coincidence detector 438 may also be programmed to generate a timing correction value as described above.

The image reconstructor 442 may include a sorter 444 that counts events occurring along each projection ray and organizes them into a two-dimensional sinogram array 446 that may be stored in a memory module 448. The image reconstructor 442 also includes an image processor 450 that controls a data bus 452 and links the image reconstructor 442 to the communication link 408. An array processor 454 also connects to the data bus 452 and may be configured to reconstruct images from the sinogram arrays 448. A resulting image array 456 may be stored in the memory module 448 and output by the processor 450 to the operator workstation 406.

The operator workstation 406 may include a workstation processor 460, a display unit 462 and an input device 464. The workstation processor 460 may connect to the communication link 408. The operator may control the operation of the PET imaging system 400, its configuration, positioning of the patient table for a scan and the gantry 402 through operator workstation 406. The operator may also control the display of the resulting image on the display unit 462 and perform image enhancement functions using programs executed by the workstation processor 460.

The various embodiments and/or components, for example, the modules, or components and controllers described herein, may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" may include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A method of correcting a timing signal that represents an arrival time of a photon at a Positron Emission Tomography (PET) detector, said method comprising:
   receiving a timing signal that represents an arrival time of a photon at a PET detector;
   receiving an energy signal indicative of an energy of the photon;
   calculating a timing correction using the energy signal;
   modifying the timing signal using the timing correction; and
   generating an image of an object using the modified timing signal, wherein the energy signal includes a direct current (DC) offset, the timing correction being based on the DC offset.

2. The method of claim 1, wherein calculating a timing correction further comprises:
   measuring the DC offset in the energy signal;
   generating a cancellation signal based on the determined DC offset; and
   utilizing the cancellation signal to modify a gamma ray event detection threshold of a primary discriminator.

3. The method of claim 1, wherein calculating a timing correction further comprises:
   measuring a plurality of values of the energy signal;
   determining time periods when no photons have interacted in the detector;
   utilizing the values of the energy signal measured during these time periods to determine a plurality of DC offsets of the energy signal for the time periods; and
   utilizing the determined DC offsets to calculate the timing correction.

4. The method of claim 3, further comprising comparing the determined DC offsets to values stored in a look-up table to calculate the timing correction.

5. The method of claim 3, further comprising:
   continuously measuring the plurality of DC offsets; and
   continuously determining an average of at least two of the DC offsets.

6. The method of claim 3, wherein the difference between at least one of the determined DC offsets and a reference value is used to calculate the timing correction.

7. A method of correcting a timing signal that represents an arrival time of a photon at a Positron Emission Tomography (PET) detector, said method comprising:
   receiving a timing signal that represents an arrival time of a photon at a PET detector;
   receiving an energy signal indicative of an energy of the photon;
   calculating a timing correction using the energy signal;
   modifying the timing signal using the timing correction; and
   generating an image of an object using the modified timing signal, wherein calculating a timing correction further comprises:
   measuring the DC offset in the energy signal;
   generating an analog cancellation signal based on the determined DC offset; and
   applying the analog cancellation signal to the timing signal to modify the timing signal.

8. An imaging system comprising:
   a plurality of detectors supported by a gantry;
   a plurality of acquisition circuits coupled to the detectors, wherein the acquisition circuits provide event detection signals; and
   a field programmable gate array (FPGA) utilized to record the event detection signals, said FPGA programmed to:
   receive a timing signal that represents an arrival time of a photon at a PET detector;
   receive an energy signal indicative of an energy of the photon;
   calculate a timing correction using the energy signal;
   modify the timing signal using the timing correction; and
   generate an image of an object using the modified timing signal, wherein the energy signal includes a direct current (DC) offset, the timing correction being based on the DC offset.

9. The system of claim 8, wherein to calculate a timing correction, said FPGA is further programmed to:
   measure the DC offset in the energy signal;
   generate an analog cancellation signal based on the determined DC offset; and
   modify a gamma ray event detection threshold of a primary discriminator using the analog cancellation signal.

10. The system of claim 8, wherein to calculate a timing correction, said FPGA is further programmed to:
    measure a plurality of the DC offsets in the energy signal;
    determine a difference between at least two of the DC offsets; and
    calculate the timing correction using the determined difference in offsets.

11. The system of claim 10, wherein the FPGA is further programmed to compare the determined difference in the DC offsets to values stored in a look-up table to calculate the timing correction.

12. The system of claim 10, wherein the FPGA is further programmed to:
continuously measure the plurality of DC offsets; and
continuously determine the difference between at least two of the DC offsets.

13. The system of claim 10, wherein the difference between the determined DC offset and a reference value is used to calculate the timing correction.

14. An imaging system comprising:
a plurality of detectors supported by a gantry;
a plurality of acquisition circuits coupled to the detectors, wherein the acquisition circuits provide event detection signals; and
a field programmable gate array (FPGA) utilized to record the event detection signals, said FPGA programmed to:
receive a timing signal that represents an arrival time of a photon at a PET detector;
receive an energy signal indicative of an energy of the photon;
calculate a timing correction using the energy signal;
modify the timing signal using the timing correction; and
generate an image of an object using the modified timing signal, wherein the energy signal includes a direct current (DC) offset, the timing correction being based on the DC offset, wherein to calculate a timing correction, said FPGA is further programmed to:
measure a direct current (DC) offset in the energy signal;
generate an analog cancellation signal based on the determined DC offset; and
apply the analog cancellation signal to the timing signal to modify the timing signal.

15. A non-transitory computer readable medium programmed to instruct a computer of a Positron Emission Tomography (PET) system to:
receive a timing signal that represents an arrival time of a photon at a PET detector;
receive an energy signal indicative of an energy of the photon;
calculate a timing correction using the energy signal;
modify the timing signal using the timing correction; and
generate an image of an object using the modified timing signal, wherein the energy signal includes a direct current (DC) offset, the timing correction being based on the DC offset.

16. A non-transitory computer readable medium programmed to instruct a computer of a Positron Emission Tomography (PET) system to:
receive a timing signal that represents an arrival time of a photon at a PET Detector;
receive an energy signal indicative of an energy of the photon;
calculate a timing correction using the energy signal;
modify the timing signal using the timing correction; and
generate an image of an object using the modified timing signal, further programmed to instruct the computer to:
measure a plurality of DC offsets in the energy signal;
determine a difference between at least two of the DC offsets; and
calculate the timing correction using the determined difference.

17. The non-transitory computer readable medium of claim 16, further programmed to instruct the computer to compare the determined difference to values stored in a look-up table to calculate the timing correction.

* * * * *